H. Epstein.
Making Chains.
N° 23,239.  Patented Mar. 15, 1859.
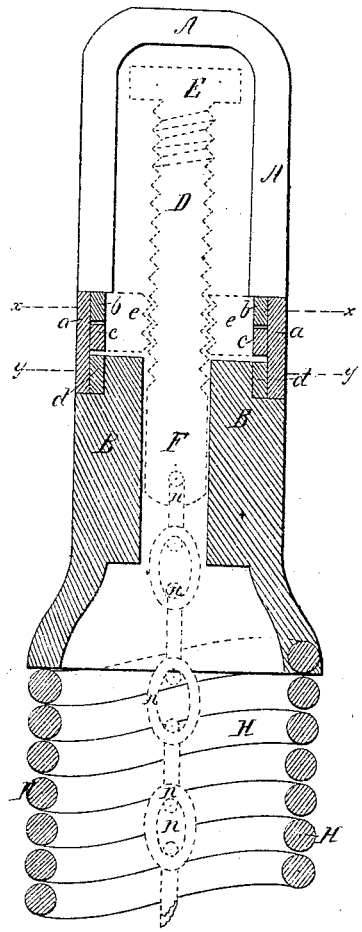
Fig. 1.
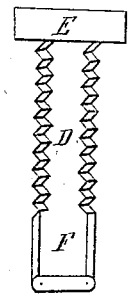
Fig. 2.
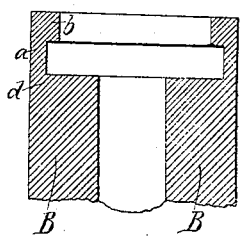
Fig. 5.
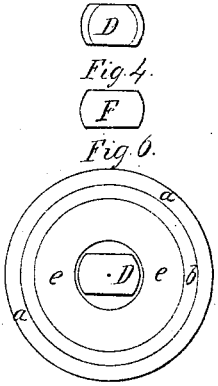
Fig. 3.
Fig. 4.
Fig. 6.
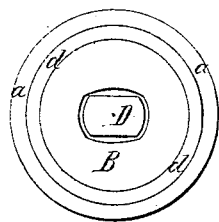
Fig. 7.
Witnesses;
Charles Wehle
Julius Wehle
Inventor;
Henry Epstein

UNITED STATES PATENT OFFICE.

HENRY EPSTEIN, OF NEW YORK, N. Y.

WATCH-CHAIN, &c.

Specification of Letters Patent No. 23,239, dated March 15, 1859.

*To all whom it may concern:*

Be it known that I, HENRY EPSTEIN, of the city, county, and State of New York, have invented a new and useful Improvement in Watch-Chains; and I do hereby declare that the following is a full, clear, and exact description thereof, reference being had to the annexed drawings, making part of this specification, in which, on a magnified scale—

Figure 1 represents a vertical section of my improvement; Fig. 2, a view of the screw; Fig. 3, a horizontal section of the screw; Fig. 4, a horizontal section of the stem of the screw; Fig. 5, a vertical section through the lower part of the box or casing; Fig. 6, a horizontal section through the line of $x$ $x$ in Fig. 1. Fig. 7, a horizontal section through the line $y$ $y$ in Fig. 1.

Similar letters of reference indicate corresponding parts in these various figures.

The nature of my invention consists in constructing a watch-chain consisting of an exterior and interior chain so arranged that it may be made stiff or inflexible whenever desired.

To enable others skilled in the art to make and use my invention I will proceed to describe it.

I construct H, the exterior chain, of a precious metal in the usual manner and attach the head of the same to the lower part of the tubular box B. The upper part A of the said tubular box or casing is connected with the former by a ring $a$, which is attached to both. The interior of this closed box contains a screw D with its top or cap E and its stem F, to the lower end of which the interior chain $n$ is fastened. The nut $e$ is made to fit to the screw D, and to the said nut a ring $c$ is attached, fitting into the ring $a$; above and below the said ring $c$, there are two other rings $b$ and $d$, fastened to the outer ring $a$. Between $c$ and $d$ there is a horizontal vacant space extending also through between $c$ and B, and forming a horizontal joint between the upper and lower part of the tubular box. The ring $c$ and the nut $e$ are attached to the upper part A, and the rings $a$, $b$ and $d$ are attached to the lower part B of the tubular casing. The screw D is so constructed, that its horizontal section does not form a full circle, but a circle two parallel segments of which are cut off, and the screw threads of which are confined to the remaining circular portions. As the inner form of the tube B corresponds with that of the screw it will be seen that the latter is thereby prevented from turning in the former, as shown in Fig. 7. The nut $e$ is cut to fit to the full screw and will freely turn on the said screw.

When the lower part of the tubular box B is held in one hand and the upper part of the same A is turned the nut $e$ will turn around the screw D, without moving upward or downward $d$ (the said nut being confined to a mere rotary motion by means of its ring $c$) and the screw D will ascend or descend without turning. If A is turned in one direction the screw D will ascend, if turned in an opposite direction it will descend. The height to which it may be raised or lowered will correspond with the length of the screw D, exclusive of its cap E and of its lower stem F. The inner chain $n$ continues to the other end of the exterior chain (not shown on the drawing) where they are united. It is manifest that when the screw D is drawn upward the inner chain will be raised, and will compress or tighten the outward chain H, and if the length of all the joints between the links of the said outward chain be equal to the length of the screw, the said exterior chain may be so tightened as to form a straight, stiff and inflexible line. It is essential for this construction that the screw should be capable of being raised and lowered without being turned, for otherwise the inner chain would turn and the exterior chain would be twisted.

Instead of attaching rings to the various parts as described the lower part B may be constructed of one piece as represented in Fig. 5, care being taken to form a tubular groove at $a$ to contain the tubular tenon of the nut $e$.

It will be best to construct the inner chain of steel, although brass or a similar metal may answer the purpose in some cases.

The principal advantage of chains thus made consists in the additional safety against stealing the watch. A person provided with this chain may stiffen the same, and the watch or chain can not be abstracted except by very violent effort, which is sure to attract the attention of the owner, nor can the chain be cut by tools usually employed for that purpose.

What I claim as new and desire to secure by Letters Patent is:

Constructing a watch-chain, which may be made stiff or inflexible at pleasure by the turning of part of the tubular casing, to which an interior chain is attached, substantially in the manner and for the purpose as described.

Dated New York December 10, 1858.

HENRY EPSTEIN.

Witnesses:
 CHARLES WEHLE,
 JULIUS WEHLE.